US011957631B2

(12) United States Patent
Cuson et al.

(10) Patent No.: US 11,957,631 B2
(45) Date of Patent: Apr. 16, 2024

(54) WHEELCHAIR AND SUSPENSION SYSTEMS

(71) Applicant: INVACARE CORPORATION, Elyria, OH (US)

(72) Inventors: Robert L. Cuson, Lagrange, OH (US); Robert A. Bekoscke, Medina, OH (US)

(73) Assignee: INVACARE CORPORATION, Elyria, OH (US)

( * ) Notice: Subject to any disclaimer, the term of this patent is extended or adjusted under 35 U.S.C. 154(b) by 0 days.

(21) Appl. No.: 17/878,943

(22) Filed: Aug. 2, 2022

(65) Prior Publication Data

US 2024/0016679 A1 Jan. 18, 2024

Related U.S. Application Data

(60) Provisional application No. 63/388,799, filed on Jul. 13, 2022.

(51) Int. Cl.
*A61G 5/10* (2006.01)

(52) U.S. Cl.
CPC .......... *A61G 5/1089* (2016.11); *A61G 5/1078* (2016.11)

(58) Field of Classification Search
CPC ............................ A61G 5/1089; A61G 5/1078
See application file for complete search history.

(56) References Cited

U.S. PATENT DOCUMENTS

| | | | |
|---|---|---|---|
| 4,513,832 | A | 4/1985 | Engman |
| 4,538,857 | A | 9/1985 | Engman |
| 5,435,404 | A | 7/1995 | Garin, III |
| 5,575,348 | A | 11/1996 | Goertzen et al. |
| 5,791,735 | A | 8/1998 | Helman |
| 5,836,654 | A | 11/1998 | Debellis et al. |
| 5,853,059 | A | 12/1998 | Goertzen et al. |
| 5,875,774 | A | 3/1999 | Clementi et al. |
| 5,899,475 | A | 5/1999 | Verhaeg et al. |
| D412,140 | S | 7/1999 | Garven, Jr. |
| D412,141 | S | 7/1999 | Dickie et al. |
| D412,142 | S | 7/1999 | Dickie |
| 5,947,562 | A | 9/1999 | Christofferson et al. |
| 5,950,263 | A | 9/1999 | Hanson et al. |
| D415,076 | S | 10/1999 | Garven, Jr. |
| 5,971,417 | A | 10/1999 | Swisshelm et al. |
| 5,997,021 | A | 12/1999 | Robinson et al. |
| 6,027,132 | A | 2/2000 | Robinson et al. |
| 6,032,975 | A | 3/2000 | Hanson et al. |
| 6,032,976 | A | 3/2000 | Alexander et al. |
| 6,033,025 | A | 3/2000 | Christofferson et al. |

(Continued)

FOREIGN PATENT DOCUMENTS

EP 3730113 A1 * 10/2020 ............... A61G 5/02

*Primary Examiner* — Toan C To

(57) ABSTRACT

Embodiments of a wheelchair and suspension system are provided. In one embodiment, a wheelchair or other vehicle having a wheel assembly is provided. The assembly includes, for example, a housing, a resilient member between two sleeves or casings, and a wheel support connected to a wheel. The resilient member compresses when there is an impact on the wheel and decompresses after the impact. In another embodiment, a wheelchair or other vehicle having a multi-purpose suspension system is provided. In one instance, the system provides suspension between to the main drive wheels and the frame. In a second instance, the system provides suspension between the anti-tip wheels and the frame.

23 Claims, 10 Drawing Sheets

(56) References Cited

U.S. PATENT DOCUMENTS 6,041,875 A 3/2000 Pulver et al.
6,059,370 A 5/2000 Kanyer et al.
6,070,898 A 6/2000 Dickie et al.
6,086,086 A 7/2000 Hanson et al.
6,095,271 A 8/2000 Dickie et al.
6,129,165 A 10/2000 Schaffner et al.
6,131,679 A 10/2000 Pulver et al.
6,135,476 A 10/2000 Dickie et al.
6,145,612 A 11/2000 Dickie
6,168,178 B1 1/2001 Garven et al.
6,176,335 B1 1/2001 Schaffner et al.
6,182,982 B1 2/2001 Fleigle
6,182,992 B1 2/2001 Garven
6,186,252 B1 2/2001 Schaffner et al.
6,196,568 B1 3/2001 Stevens
6,199,647 B1 3/2001 Schaffner et al.
6,217,050 B1 4/2001 Dickie et al.
6,217,052 B1 4/2001 Slagerman
6,224,156 B1 5/2001 Fleigle
6,227,559 B1 5/2001 Slagerman et al.
6,234,507 B1 5/2001 Dickie et al.
6,234,576 B1 5/2001 Fleigle
6,234,732 B1 5/2001 Trippensee et al.
6,241,275 B1 6/2001 Slagerman
6,247,717 B1 6/2001 Lovins et al.
6,250,661 B1 6/2001 Dickie et al.
6,264,218 B1 7/2001 Slagerman
6,264,225 B1 7/2001 Kunishige et al.
6,270,111 B1 8/2001 Hanson et al.
6,273,443 B1 8/2001 Fleigle
6,273,445 B1 8/2001 Garven
6,296,265 B1 10/2001 Lovins
6,312,000 B1 11/2001 Pauls et al.
6,312,002 B1 11/2001 Slagerman
6,318,751 B1 11/2001 Slagerman
D451,851 S 12/2001 Dickie et al.
6,352,273 B1 3/2002 Dickie
6,352,307 B1 3/2002 Engman
6,357,793 B1 3/2002 Dickie et al.
6,363,556 B1 4/2002 Krauska et al.
6,409,265 B1 6/2002 Koerlin et al.
6,450,581 B1 9/2002 Koerlin
6,473,922 B1 11/2002 Sommerfeld et al.
6,474,689 B2 11/2002 Mulhern et al.
6,491,122 B2 12/2002 Leitner et al.
6,499,756 B2 12/2002 Amirola
6,520,526 B2 2/2003 Amirola
6,520,594 B2 2/2003 Amirola
6,533,306 B2 3/2003 Watkins
6,543,798 B2 4/2003 Schaffner et al.
6,547,206 B1 4/2003 Dickie
6,568,874 B1 5/2003 Sommerfeld et al.
6,572,133 B1 6/2003 Stevens
6,588,792 B1 7/2003 Koerlin et al.
6,601,271 B1 8/2003 Sommerfeld et al.
6,640,916 B2 11/2003 Schaffner et al.
6,688,571 B1 2/2004 Pauls
6,688,693 B2 2/2004 Christofferson et al.
6,715,783 B1 4/2004 Hanson et al.
6,715,784 B2 4/2004 Koerlin et al.
D491,115 S 6/2004 Taylor
6,749,262 B2 6/2004 Schaffner et al.
6,776,430 B2 8/2004 White et al.
6,796,568 B2 9/2004 Martis et al.
6,913,318 B2 7/2005 Higley et al.
6,923,278 B2 8/2005 Mulhern et al.
6,932,369 B2 8/2005 Walsh et al.
6,938,923 B2 9/2005 Mulhern et al.
6,944,910 B2 9/2005 Pauls
6,974,194 B2 12/2005 Schreiber et al.
6,976,699 B2 12/2005 Koerlin
7,007,965 B2 3/2006 Bernatsky et al.
7,021,640 B2 4/2006 Knopf et al.
D521,909 S 5/2006 Gillett et al.
D521,910 S 5/2006 Gillett et al.
D521,911 S 5/2006 Gillett et al.
7,113,854 B2 9/2006 Mansell et al.
7,146,666 B2 12/2006 Christofferson et al.
7,159,181 B2 1/2007 Mansell et al.
7,207,403 B2 4/2007 Grymko et al.
7,219,924 B2 5/2007 Mulhern et al.
7,222,881 B1 5/2007 Zhou
7,231,689 B2 6/2007 Scheiber et al.
7,232,008 B2 6/2007 Levi et al.
7,234,554 B2 6/2007 Mulhern et al.
7,249,773 B2 7/2007 Schreiber et al.
7,249,777 B2 7/2007 Schreiber
7,264,272 B2 9/2007 Mulhern et al.
7,296,856 B2 11/2007 Rozaieski et al.
7,310,776 B2 12/2007 Mansell et al.
7,311,329 B2 12/2007 Mulhern
7,314,220 B2 1/2008 Turturiello et al.
7,316,282 B2 1/2008 Mulhern et al.
7,344,155 B2 3/2008 Mulhern et al.
7,353,566 B2 4/2008 Scheiber et al.
7,360,781 B2 4/2008 Schreiber et al.
7,360,792 B2 4/2008 Turturiello et al.
7,360,840 B2 4/2008 Barlow et al.
7,360,841 B2 4/2008 Barlow et al.
7,377,588 B2 5/2008 Schreiber
7,389,835 B2 6/2008 Mulhern et al.
7,413,038 B2 8/2008 Mulhern et al.
7,425,010 B2 9/2008 Harris
7,540,520 B2 6/2009 Barlow et al.
7,556,109 B2 * 7/2009 Chen ........................ A61G 5/06 180/908
7,571,502 B2 8/2009 Frano et al.
7,614,704 B2 11/2009 Whelan et al.
7,726,689 B2 6/2010 Mulhern et al.
7,735,591 B2 6/2010 Puskar-Pasewicz et al.
7,753,630 B2 7/2010 Jeppsson
7,766,106 B2 8/2010 Puskar-Pasewicz et al.
7,784,587 B2 8/2010 Zablocky
D627,271 S 11/2010 Knopf
7,857,394 B2 12/2010 Whelan et al.
7,896,394 B2 3/2011 Jackson et al.
7,896,438 B2 3/2011 Whelan et al.
D635,492 S 4/2011 Art et al.
D635,493 S 4/2011 Art et al.
7,931,300 B2 4/2011 Mulhern et al.
7,946,654 B2 5/2011 Tsuber et al.
7,967,095 B2 6/2011 Kosco et al.
8,037,953 B2 10/2011 Puskar-Pasewicz et al.
8,078,365 B2 12/2011 Emilsson
8,096,570 B2 1/2012 Schneider et al.
8,113,531 B2 2/2012 Zhou et al.
8,181,992 B2 5/2012 Mulhern et al.
8,197,009 B2 6/2012 Whelan et al.
8,210,556 B2 7/2012 Zhou et al.
8,256,785 B2 9/2012 Knopf
8,262,117 B2 9/2012 Knopf et al.
8,286,745 B2 10/2012 Kosco et al.
8,292,010 B2 10/2012 Puskar-Pasewicz et al.
8,322,741 B2 12/2012 Laslo et al.
8,328,215 B2 12/2012 Knopf
8,408,343 B2 4/2013 Puskar-Pasewicz et al.
8,408,598 B2 4/2013 Mulhern et al.
8,419,130 B2 4/2013 Bergman
8,469,383 B2 6/2013 Zhou et al.
8,474,848 B2 7/2013 Bernatsky et al.
8,474,849 B2 7/2013 Engman et al.
8,490,994 B2 7/2013 Knopf
8,509,962 B2 8/2013 Doherty et al.
8,596,719 B2 12/2013 Engman et al.
8,616,309 B2 12/2013 Art et al.
8,622,410 B2 1/2014 Engman et al.
8,636,321 B1 1/2014 Engman et al.
8,851,214 B2 10/2014 Mirzaie
8,894,145 B2 11/2014 Engman et al.
8,911,019 B2 12/2014 Josten et al.
8,944,454 B2 2/2015 Blauch et al.
8,998,245 B1 4/2015 Anooshian et al.
9,033,360 B2 5/2015 Davis et al.
9,180,061 B2 11/2015 Engman et al.

(56) References Cited

U.S. PATENT DOCUMENTS

| | | | | |
|---|---|---|---|---|
| 9,271,885 | B2 | 3/2016 | Engman et al. | |
| 9,301,894 | B2 | 4/2016 | Mulhern et al. | |
| 9,320,661 | B2 | 4/2016 | Mirzaie | |
| 9,351,889 | B2 * | 5/2016 | Mulhern ................ | A61G 5/128 |
| 9,427,364 | B2 | 8/2016 | Grant et al. | |
| 9,440,690 | B2 | 9/2016 | Manternach et al. | |
| 9,452,096 | B2 | 9/2016 | Karpinski et al. | |
| 9,468,571 | B2 | 10/2016 | Art et al. | |
| 9,474,664 | B2 | 10/2016 | Mulhern et al. | |
| 9,522,711 | B2 | 12/2016 | Kosco et al. | |
| 9,526,664 | B2 | 12/2016 | Mulhern et al. | |
| 9,554,955 | B2 | 1/2017 | Blauch et al. | |
| 9,566,200 | B2 | 2/2017 | Mulhern et al. | |
| 9,575,503 | B2 | 2/2017 | Josten et al. | |
| 9,579,242 | B2 | 2/2017 | Mirzaie | |
| 9,622,926 | B2 | 4/2017 | Andersson | |
| D787,383 | S | 5/2017 | Elon et al. | |
| D793,289 | S | 8/2017 | Jahkel | |
| D801,233 | S | 10/2017 | Mulhern et al. | |
| D801,234 | S | 10/2017 | Elon et al. | |
| 9,795,523 | B2 | 10/2017 | Holst et al. | |
| 9,795,527 | B2 | 10/2017 | Stenstrom et al. | |
| 9,808,383 | B2 | 11/2017 | Mulhern et al. | |
| 9,872,804 | B2 | 1/2018 | Puskar-Pasewicz et al. | |
| D811,279 | S | 2/2018 | McCollough et al. | |
| 10,016,322 | B2 | 7/2018 | Engman et al. | |
| 10,058,466 | B2 | 8/2018 | Kalf et al. | |
| 10,084,267 | B2 | 9/2018 | Clarius | |
| 10,092,465 | B2 | 10/2018 | Van De Wal et al. | |
| D833,919 | S | 11/2018 | McCollough et al. | |
| D833,920 | S | 11/2018 | Grant | |
| 10,130,532 | B2 | 11/2018 | Mulhern et al. | |
| 10,182,953 | B2 | 1/2019 | Tsuber | |
| D839,791 | S | 2/2019 | Grant | |
| 10,201,464 | B2 | 2/2019 | Kalf et al. | |
| 10,206,832 | B2 | 2/2019 | Danielsson et al. | |
| 10,238,558 | B2 | 3/2019 | Kramer | |
| 10,258,522 | B2 | 4/2019 | Kalf et al. | |
| 10,272,004 | B2 | 4/2019 | Art et al. | |
| 10,350,121 | B2 | 7/2019 | Bergman | |
| D857,562 | S | 8/2019 | McCollough et al. | |
| D860,068 | S | 9/2019 | Grant | |
| D860,873 | S | 9/2019 | Grant | |
| 10,479,436 | B2 | 11/2019 | Kosco et al. | |
| 10,500,113 | B2 | 12/2019 | Torgersson | |
| 10,561,548 | B1 | 2/2020 | Mulhern et al. | |
| 10,568,790 | B2 | 2/2020 | Jahkel et al. | |
| 10,588,797 | B2 | 3/2020 | Mulhern et al. | |
| 10,667,970 | B2 | 6/2020 | Van De Wal et al. | |
| 10,687,997 | B2 | 6/2020 | Mulhern et al. | |
| D891,310 | S | 7/2020 | Grant | |
| 10,702,430 | B2 | 7/2020 | Karpinski et al. | |
| D891,996 | S | 8/2020 | Grant | |
| 2001/0026059 | A1 * | 10/2001 | Smith .................... | B62K 19/34<br>267/132 |
| 2004/0046358 | A1 * | 3/2004 | White .................. | A61G 5/1075<br>280/304.1 |
| 2006/0097478 | A1 * | 5/2006 | Goertzen ............. | A61G 5/1089<br>280/755 |
| 2007/0209845 | A1 * | 9/2007 | Chen ..................... | B60B 33/045<br>180/15 |
| 2011/0083913 | A1 * | 4/2011 | Cuson .................... | A61G 5/043<br>180/65.1 |

* cited by examiner

WHEELCHAIR AND SUSPENSION SYSTEMS

RELATED APPLICATIONS

This application claims priority to U.S. Provisional Patent Application No. 63/388,799, filed on Jul. 13, 2022, titled Wheelchair and Suspension Systems, the entire disclosure of which is incorporated herein by reference.

Wheelchairs and scooters are an important means of transportation for a significant portion of society. Whether manual or powered, these vehicles provide an important degree of independence for those they assist. However, this degree of independence can be limited if the wheelchair is required to traverse obstacles such as, for example, curbs, bumps, and irregular riding surfaces that are commonly present on sidewalks, driveways, and other paved surfaces.

Most wheelchairs have front and/or rear anti-tip wheels to stabilize the chair from excessive tipping forward or backward and to ensure that the drive wheels are in contact with the ground. These wheels are typically much smaller than the drive wheels. Examples of such anti-tip or stabilizing wheels are disclosed in U.S. Pat. Nos. 5,435,404, 5,575,348, 5,853,059, 6,041,875, and 6,131,679, and EP 2,497,452 A1, which are hereby fully incorporated by reference.

When front and/or rear anti-tip wheels make contact with obstacles (e.g., curbs, bumps, cracks, etc.) being traversed, an impact and/or shock action may be felt by the wheelchair user. This impact and/or shock action reduces the user's ride comfort.

Anti-tip and/or stabilization wheels are sometimes provided as caster wheels having the ability to swivel. In certain situations, a caster wheel can experience flutter, which causes the caster wheel to swing from side to side as it rolls forward. This flutter action creates vibrations and noise that also reduce a user's ride comfort.

In another aspect, rear wheel drive wheelchairs sometimes include rear anti-tip wheels designed to limit the rearward tipping of the wheelchair. Typically, the rearward tipping action is stopped suddenly when the rear anti-tip wheel makes contacts with the riding or supporting surface of the wheelchair. Such an abrupt stopping action can be jarring or otherwise unpleasant for the wheelchair user.

While these configurations provide beneficial features for wheelchairs and other vehicles, additional improvements are desirable for providing more comfortable and stable rides that address, for example, impacts or shocks when traversing obstacles, flutter and/or anti-tipping behavior.

SUMMARY

In one embodiment, a wheelchair or other vehicle having a wheel assembly is provided. The assembly includes, for example, a housing, a resilient member between two sleeves or casings, and a wheel support connected to a wheel. The resilient member compresses when there is an impact on the wheel and decompresses after the impact. In another embodiment, a wheelchair or other vehicle having a multi-purpose suspension system is provided. In one instance, the system provides suspension between the main drive wheel(s) and the frame. In a second instance, the system provides suspension between the anti-tip wheel(s) and the frame.

BRIEF DESCRIPTION OF THE DRAWINGS

In the accompanying drawings which are incorporated in and constitute a part of the specification, embodiments of the inventions are illustrated, which, together with a general description of the inventions above, and the detailed descriptions given below, serve to example the principles of the inventions. Further, the drawings have been shown in relative scale by way of example for the components depicted therein. While shown in relative scale, it is not the intention to limit the scale, sizes or positions of the components to those expressly shown and other scales, sizes, and positions are expressly contemplated herein.

DESCRIPTION

Embodiments of the invention disclosed herein include various descriptions of components and connections. Where two or more components are shown or described as being connected, it is the intent of the disclosure to mean that those two or more components can be connected either directly or indirectly through one or more intermediary components. Similarly, where a component is shown or described in unitary form, it is the intent of the disclosure to mean the component can also be in the form of an assembly of sub-components, pieces, or parts.

One embodiment of the inventions provides, for example, a wheelchair having one or more an anti-shock caster wheel assemblies. The anti-shock caster wheel assembly includes one or more resilient members in contact (either directly and/or indirectly) with a wheel support connected to a wheel. The one or more resilient members compress when there is an impact on the wheel and decompress after the impact. In this manner, the impact on the wheel is at least partially absorbed, if not significantly absorbed, by the compression action of the resilient member.

Figure 1:
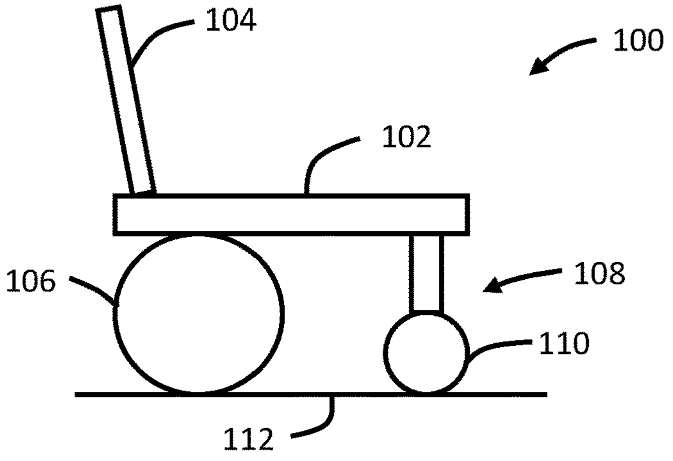
FIGS. 1 and 2 illustrate an embodiment of a power wheelchair.

Referring now to FIG. 1, one embodiment of a wheelchair 100 is schematically illustrated. Wheelchair 100 includes a frame 102, seating system 104, drive wheel 106, front wheel assembly 108, and front wheel 110. Wheelchair 100 rides along the supporting surface 112. While FIG. 1 shows wheelchair 100 in the form of a rear wheel drive configuration, other configurations are also included such as, for example, center wheel drive and front wheel drive. Each of these configurations include at least one support wheel assembly such as, for example, front wheel assembly 108. Thus, while front wheel assembly 108 is shown near the front of wheelchair 100, in other embodiments, wheel assembly 108 can be located near the rear of wheelchair 100 (e.g., in the case of a front wheel drive wheelchair) or can be located at both the front and the rear of wheelchair 100 (e.g., in the case of the center wheel drive wheelchair). Examples of front wheel drive and center wheel drive wheelchairs can be found in, for example, U.S. Pat. Nos. 11,234,875 and 11,096,845, which are hereby incorporated by reference.

Figure 2:
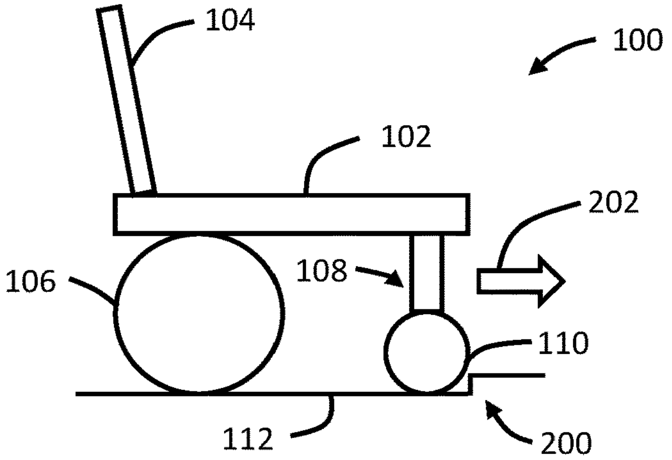

FIG. 2 illustrates wheelchair 100 moving forward (arrow 202) toward an obstacle 200. Obstacle 200 can be, for example, curb, bump, rough terrain, changes in terrain or elevation, potholes or cracks, and the like. As wheel 110 contacts these obstacles to drive over them, impacts or shocks to wheel 110 are sent throughout the wheelchair including to the user. This reduces the user's ride comfort and contributes to wear-and-tear on the wheelchair.

Figure 3:
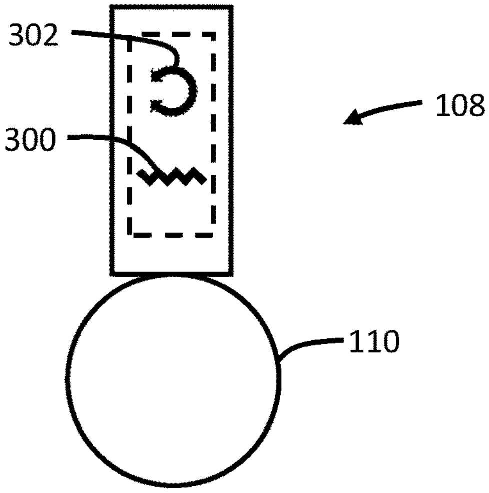
FIG. 3 illustrates one embodiment of a wheel assembly.

FIG. 3 is a schematic illustration of wheel assembly 108. Will assembly 108 includes an anti-impact or anti-shock system 300. Anti-shock system 300 is configured to absorb at least partially, if not completely, impacts and shocks to wheel 110 to lessen their transmission throughout the wheelchair and to the user. This can be accomplished by having resilient or compressible/de-compressible member(s) or component(s). In this manner, user ride comfort is increased, and wear-and-tear from impacts and shocks is reduced.

Wheel assembly 108 can also, separately or in combination with anti-shock system 300, include an anti-flutter system 302. Flutter occurs when a caster wheel swings from side to side as it rolls forward. Flutter creates unwanted vibration and noise for the wheelchair thereby reducing user ride comfort and wear-and-tear on the wheel and wheel assembly. Anti-flutter system 302 includes friction component(s) that dampen or otherwise reduce the susceptibility of wheel assembly 108 to flutter.

Figure 4:
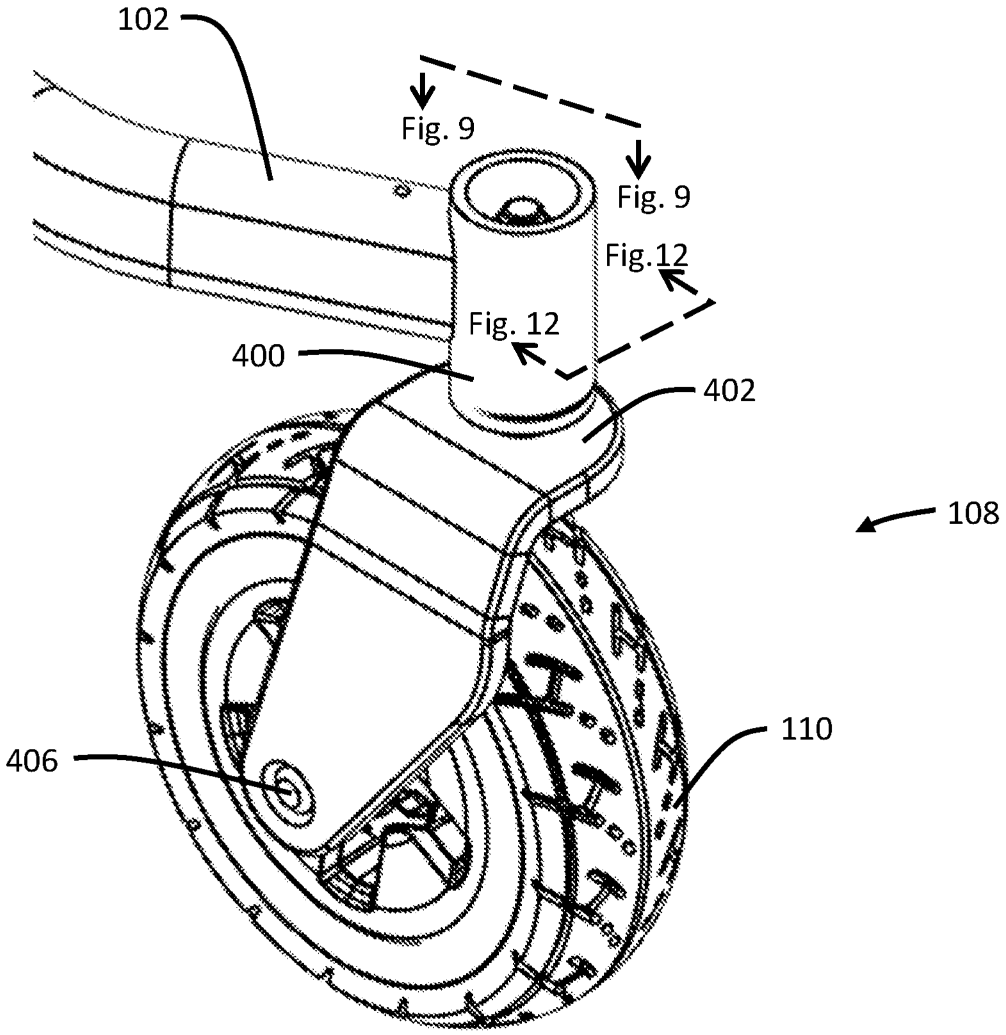
FIG. 4 is a partial perspective view illustrating another embodiment of a wheel assembly.

FIG. 4 illustrates a partial perspective view of one embodiment of a wheel assembly 108. Assembly 108 includes a headtube 400, wheel support 402, and wheel axle 406. Headtube 400 is connected to and supported on a member of frame 102. Wheel support 402 can be single (as shown) or double-sided and is connected to headtube 400 via a stem and other components. Wheel support 402 also includes axle 406 for mounting and supporting wheel 110. In the case of a caster wheel embodiment, wheel support 402 can rotate or swivel with respect to headtube 400 thereby allowing wheel 110 to change direction. In one embodiment, anti-shock system 300 can reside within headtube 400. Similarly, in one embodiment, anti-flutter system 302 can also reside within headtube 400. In other embodiments, anti-shock system 300 and/or anti-flutter system 302 can reside externally to headtube 400.

Figure 5:
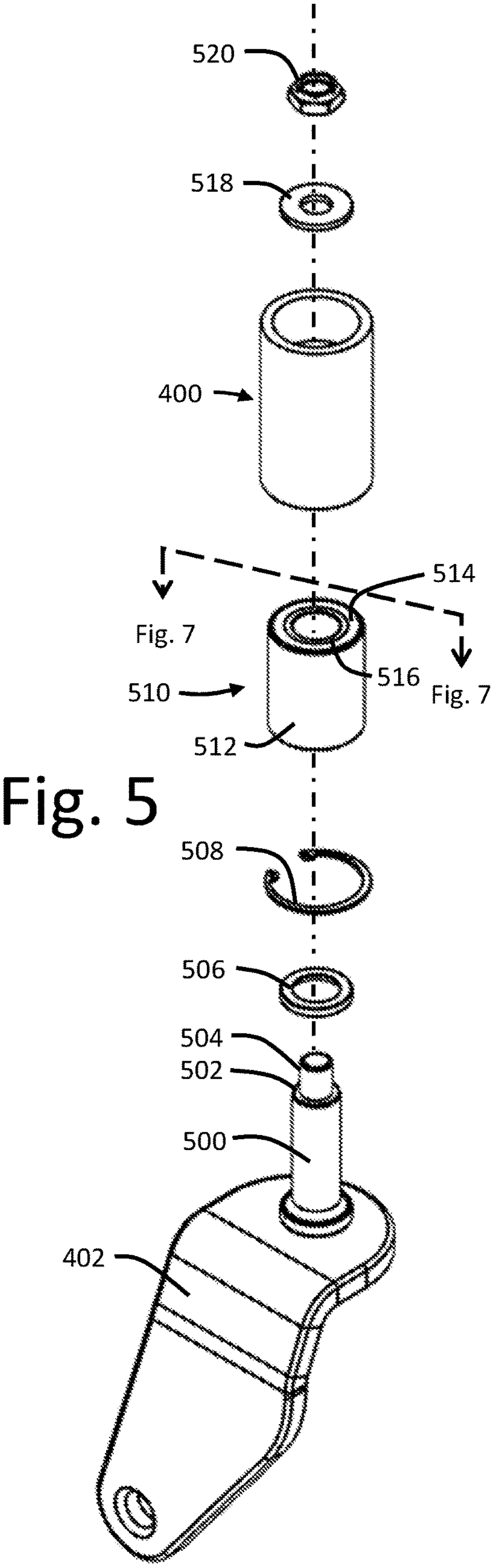
FIG. 5 is an exploded perspective view of one embodiment of a wheel assembly.

FIG. 5 illustrates an exploded perspective view of one embodiment of wheel assembly 108. Assembly 108 includes a stem body 500 that is connected to wheel support 402. Stem body 500 includes shoulder 502 and threaded end portion 504. A washer/spacer 506 is included for placement near the base stem body 500 (e.g., see FIG. 9). An assembly 510 is provided and includes anti-shock 300 and/or anti-flutter 302 capability for the wheel assembly. As will be described in more detail with reference to FIG. 6, one embodiment of assembly 510 includes a first sleeve, casing, or body 512, a resilient member or body 514, and a second sleeve, casing or body 516. A retaining ring or clip 508 is provided for retaining at least one end of assembly 510 within the inner space of headtube 400 (e.g., see FIGS. 8 and 9). Stem body 500 is received within and through an inner space of assembly 510. A washer/spacer 518 and a fastener/nut 520 connect to threaded end portion 504 of stem body 500 to retain the components within headtube 400.

Figure 6:
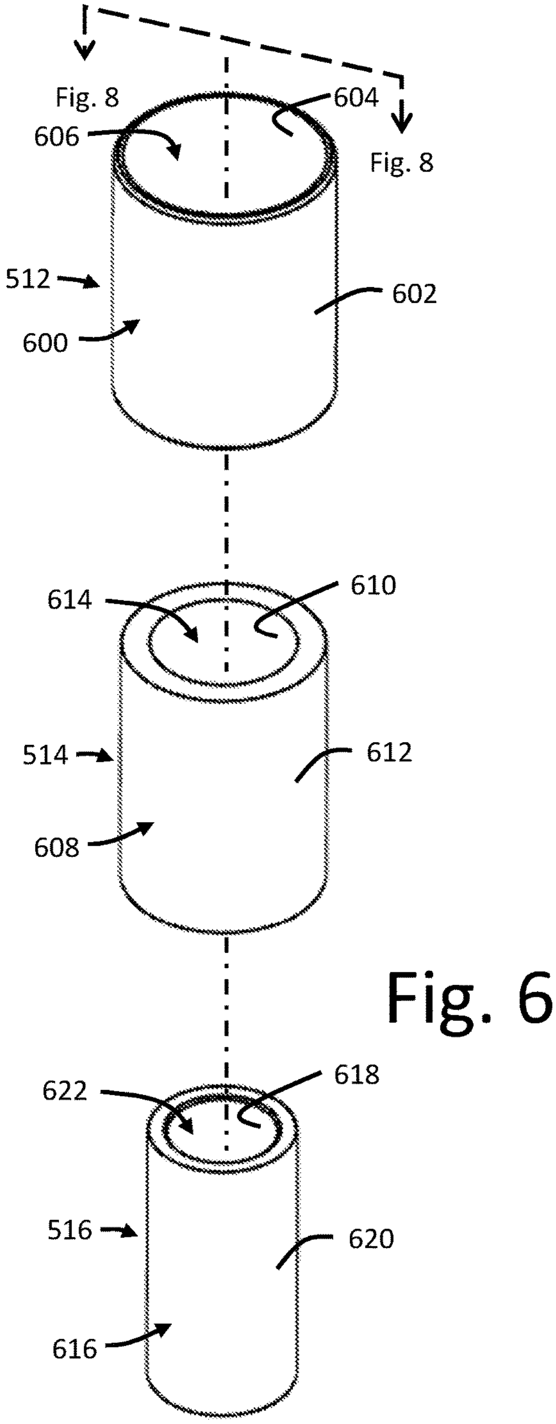
FIG. 6 is an exploded perspective view of one embodiment of an anti-shock and/or anti-flutter assembly.

FIG. 6 is an exploded perspective view of one embodiment of anti-shock and/or anti-flutter assembly 510. Assembly 510 includes, for example, one or more components having the ability to absorb shock and/or reduce or provide resistance to flutter. As illustrated, first sleeve 512 includes a body 600 having an outer wall 602 and an inner wall 604. Body 600 also includes an inner space 606 for receiving resilient member 514. Resilient member 514 includes a body 608 having outer wall 612 and inner wall 610. Resilient member 514 also includes an inner space 614 for receiving second sleeve 516. Second sleeve 516 includes a body 616 having inner wall 618 and outer wall 620. Body 616 also includes an inner space 622 for receiving stem 500 (e.g., see FIG. 9) or additional assembly components (e.g., see FIG. 7B). While bodies 600, 608, and 616 have been shown having a cylindrical geometry, other geometries are also contemplated including oval, conical, square, rectangular, tubular, and other polygonal or round shapes. Further, while components 512 and 516 have been shown as being in a sleeve configuration, other configurations are also contemplated including being in a casing and/or tubular configurations having inner and outer wall surfaces and inner spaces. In one embodiment, sleeves 512 and 516 are preferably made of a material such as metal, ceramic, carbon-fiber, fiberglass, plastic, etc. Still further, while resilient member 514 is shown having a cylindrical or tubular geometry, other geometries are also possible. Resilient member 514 can be made of any resilient and/or elastic material such as, for example, polymer and non-polymer rubbers and other elastomeric materials, springs, etc. Also, any of the foregoing components can be made of two or more subcomponents. For example, two half cylinders can be combined to form a single complete cylinder, etc.

Figure 7A:
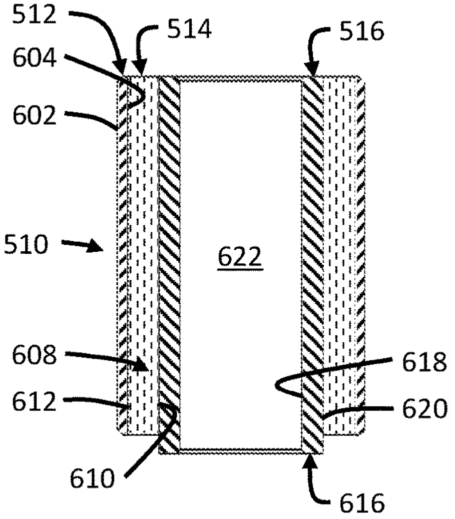
FIGS. 7A and 7B are cross-sectional views taken along section lines indicated in FIG. 5.
Figure 7B:
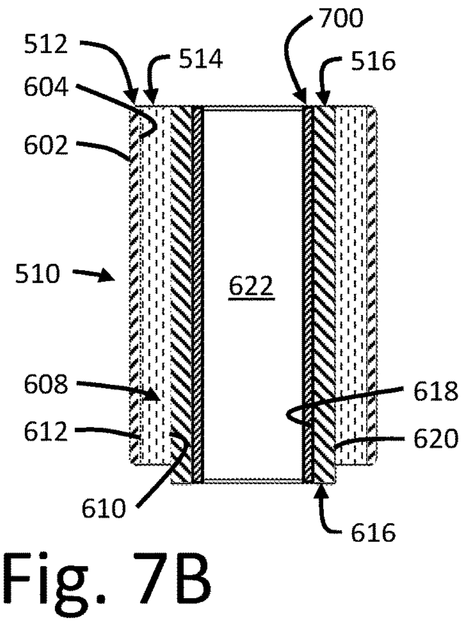

Referring now to FIGS. 7A and 7B, sectional views of anti-shock and/or anti-flutter assembly 510 taken along section lines shown in FIG. 5 are illustrated. In this embodiment, resilient member 514 is received within the inner space of first sleeve 512. In one embodiment, outer wall 612 of resilient member 514 engages with inner wall 604 of first sleeve 512 through any number of arrangements. In one embodiment, resilient member 512 is injection molded into the space between first and second sleeves 512 and 516. An adhesion promotor may also be used with inner wall 604 of first sleeve 512 and outer wall 616 of second sleeve 516 but may not be necessary in all situations. Arranged as such, second sleeve 516 is positioned (or received depending on the arrangement) within the inner space of resilient member 514. In other embodiments, these wall-to-wall engagements can be via press-fit, interference fit, adhesives, glues, weldments, etc. So constructed, first sleeve 512 retains within its inner space resilient member 514 and second sleeve 516. In yet another embodiment shown in FIG. 7B, an additional sleeve 700 can be included with its outer wall contacting inner wall 618 of second sleeve 516. Accordingly, assembly 510 can be constructed with its components to form a unitary and replaceable assembly for use with, for example, a caster or other wheel assembly.

Figure 8:
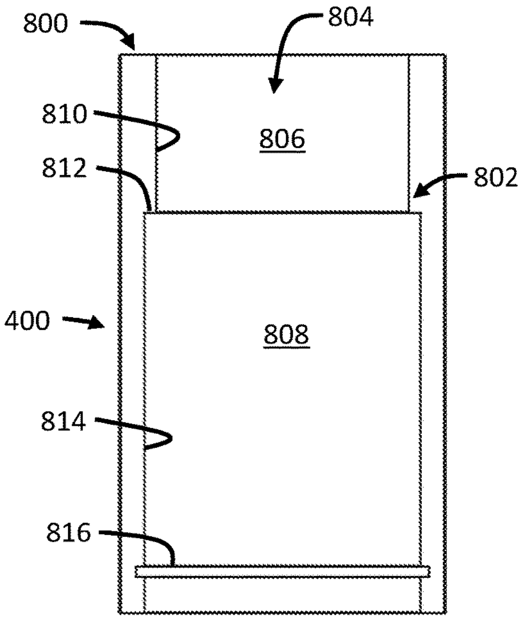
FIG. 8 is a sectional view taken along section lines indicated in FIG. 6.

FIG. 8 illustrates a sectional view of headtube 400 taken along section lines indicated in FIG. 6. Headtube 400 includes a body 800 having inner walls 802, outer walls 804, a fastener space 806 and a receiving space 808 for receiving assembly 510. Headtube 400 also includes shoulder 812 for limiting the insertion distance of assembly 510, inner wall 814 for engagement with assembly 510, and recess portion 816 for receiving retaining ring/clip 508.

Figure 9:
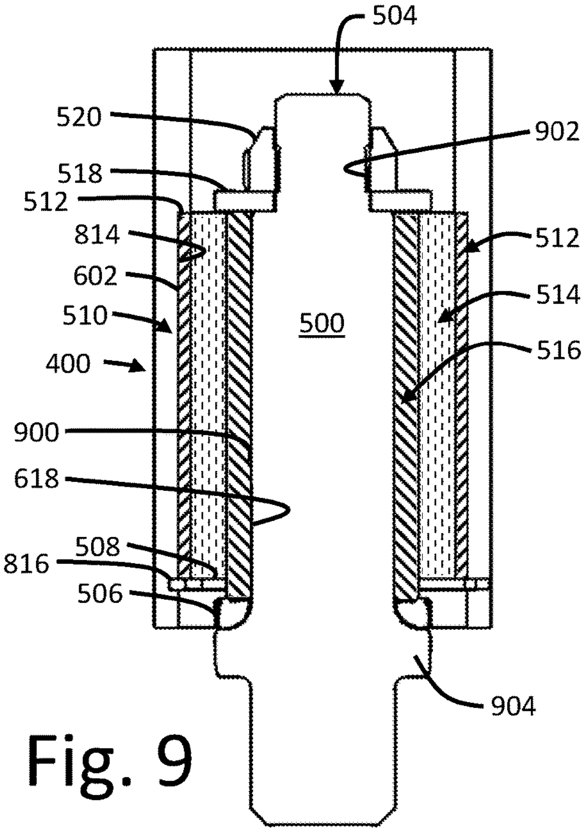
FIG. 9 is a sectional view taken along section lines indicated in FIG. 4.

FIG. 9 shows a sectional view of headtube 400 having anti-shock and/or anti-flutter assembly 510 and wheel support spindle 900 assembled therein and taken along section lines indicated in FIG. 4. In one embodiment, assembly 510 is received within headtube receiving space 808 via a press-fit arrangement. The press-fit arrangement can include outer wall 602 of the body of first sleeve 600 contacting and pressing against inner wall 814 of headtube 400. The press-fit arrangement provides a substantially rigid connection between headtube 400 and assembly 510. In other embodiments, a keyed or slotted arrangement, glues, adhesives, weldments and/or fasteners between headtube 400 and assembly 510 can also be used. Retaining ring/clip 508 is at least partially received within recess portion 816 to also assist in retaining the position of assembly 510.

Spindle 500 is received within inner space 622 of assembly 510. In one embodiment, a friction arrangement is used to retain spindle 500 within assembly 510. The friction arrangement can include the outer wall of spindle 500 contacting and some pressing against inner wall 618 of the body of second sleeve 616. In other embodiments, a small amount or thin layer of lubricant may be provided between spindle 500 and assembly 510 to allow spindle 500 to rotate within assembly 510. In yet other embodiments, a very small gap may be provided between spindle 500 and assembly 510 to allow for such rotation. In yet other embodiments, such as that shown in FIG. 7B, spindle 500 may press against further sleeve 700 of assembly 510, which is a self-lubricating sleeve or bushing made of metal, plastic, polymer, fiberglass, etc. One example of such a self-lubricating sleeve or bushing is manufactured by Igus, Inc., P.O. Box 14349, East Providence, RI 02914. In any of the embodiments, a friction arrangement allows spindle 500 to rotate within assembly 510 as necessary wheel 110 (FIG. 1) to track properly.

Fastener/nut 520 and washer/spacer 518 are attached to the threaded end 504 of spindle 500. This retains spindle 500 within assembly 510 and headtube 400 by drawing spindle 500, shoulder 904 and washer/spacer 506 up against assembly 510, which is retained within the headtube via shoulder 812 and retaining ring/clip 508. This arrangement also provides an adjustable anti-flutter arrangement for spindle 500. The arrangement of spindle 500 being received within second sleeve 616 produces a degree of friction between the two components that introduces an anti-flutter control for wheel spindle 500. That is, the friction existing between inner surface 618 of second sleeve 616 and the rotation of spindle 500 therein provides anti-flutter control by introducing an amount of resistance to rotation of spindle 500. Sleeve 616 acts as a bushing in this regard for spindle 500. The amount of friction and, hence, anti-flutter control, can be varied by choice of materials for sleeve 616 and spindle 500 or by decreasing the tolerance between the two components. For example, sleeve 616 can be, for example, a metal such as brass (or other metal or alloy), polymer, plastic, etc. and spindle 500 can be metal such as, for example, steel or other metal or alloy. Moreover, the aforementioned self-lubricating sleeve/bushing 700 can also be used for anti-flutter control where the lubricating properties of sleeve/bushing are specified to provide an amount of friction. Generally, the higher the friction between assembly 510 and spindle 500, the more anti-flutter control that is introduced to reduce the rotating action of spindle 500 within assembly 510. However, the amount of friction should generally not be so high that spindle 500 cannot rotate or so high that the ability of the wheelchair to turn is significantly negatively impacted.

In some prior art designs, bearings have been used to allow spindle 500 to rotate within headtube 400. Flutter control was attempted by tightening down the headtube/spindle assembly to apply a compressive force on the bearing balls/elements to introduce a degree of friction thereon. However, standard bearing assemblies are not configured to be adjusted in this manner and such adjustments can introduce pre-mature wear-and-tear and failure of the bearing(s).

Figure 10:
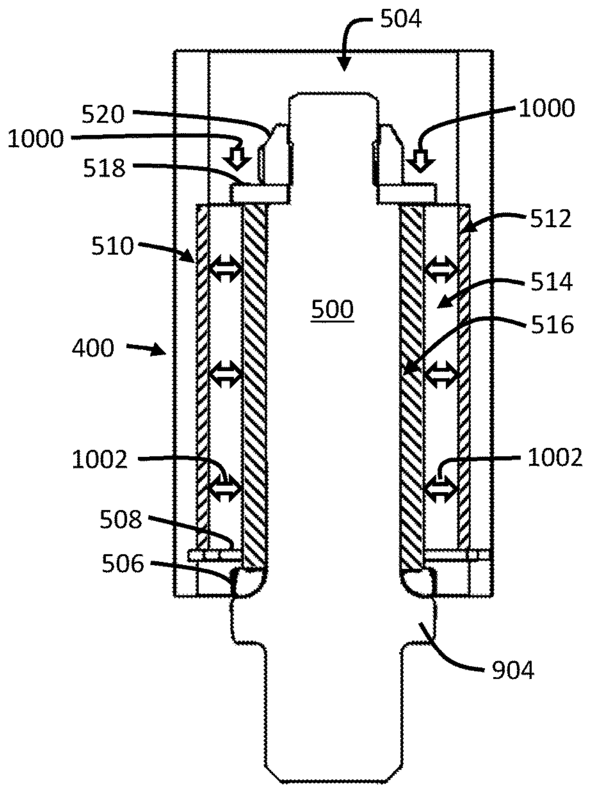
FIG. 10 is a sectional view of FIG. 9 annotated with arrows schematically representing force compression/decompression.
Figure 11:
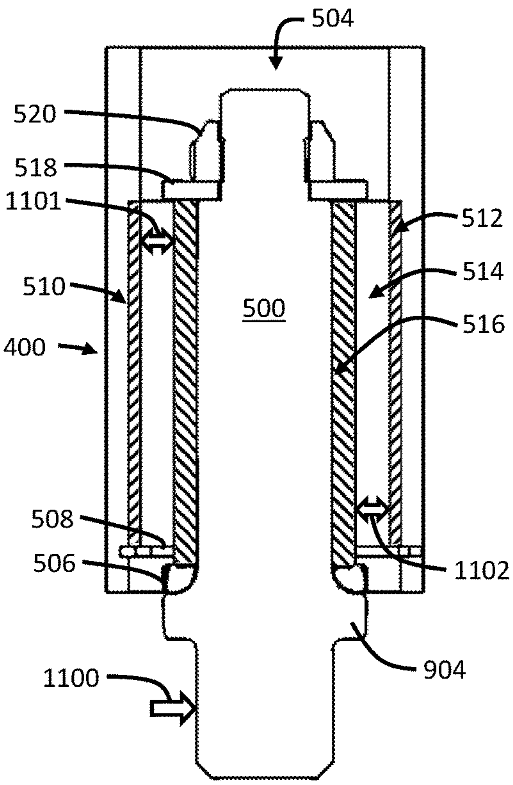
FIG. 11 is a sectional view of FIG. 9 annotated with arrows schematically representing one example of a shock or impact force.

FIG. 10 is a sectional view of FIG. 9 annotated with arrows 1002 schematically showing force compression/decompression. As previously described, biasing/resilient/elastomeric member 514 includes a body 608 that can compress and decompress. Arrows 1002 schematically represents the ability of member 514 to compress and decompress within assembly 510. This compression and decompression allows member 514 to absorb shocks and impacts on wheel 110 through spindle 500. Referring now to FIG. 11, arrow 1100 schematically represents a shock or impact force on wheel 110 (and correspondingly transmitted up to spindle 510) caused by, for example, driving over a large lump or curb. Resilient member 514 absorbs the shock or impact by acting as a lever compressing in an area generally opposite the shock or impact force. In this example, the areas of compression are schematically illustrated by arrows 1101 and 1102 generally being between the second sleeve 516 in the first sleeve 512. As a practical matter, the compression of resilient member 512 will be distributed about its body with concentrations generally opposite each other to absorb the shock or impact.

Figure 12:
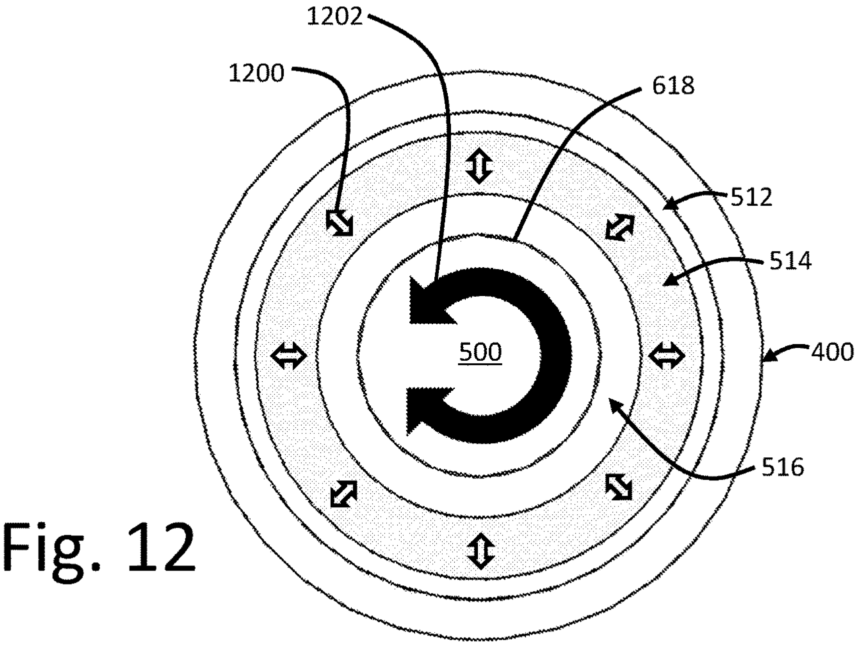
FIG. 12 is another sectional view taken along lines indicated in FIG. 4.

FIG. 12 is a sectional view taken along lines indicated in FIG. 4 schematically showing resilient member 512 and its ability compress and decompress 360 degrees in direction around its body. Arrows 1200 schematically indicate the compression and decompression capability. Thus, assembly 510 has an anti-shock arrangement able to absorb shocks or impacts from wheel 110/spindle 500 in all directions. This provides the user with a more comfortable, secure and confident driving experience. It also lessens wear-and-tear on the wheelchair components from such shocks and impacts.

Still referring to FIG. 12, arrow 1202 schematically indicates the rotation of spindle 500. As described in connection with FIG. 9, assembly 510 also provides an anti-flutter arrangement, which provides friction on spindle 500 as it rotates within assembly 510. By reducing flutter action, and associated noise and vibration, a more comfortable, secure and confident driving experience is provided, and wear-and-tear is also reduced.

In another aspect, one embodiment of a wheel drive wheelchair is provided having at least one rear anti-tip wheel. The rear anti-tip wheel is connected to the wheelchair to limit rearward tipping of the wheelchair. Rather than providing a hard or jarring stop action to such rearward tipping, a smoother and softer stop action to the tipping is provided by a suspension system of the present embodiment.

Figure 13A:
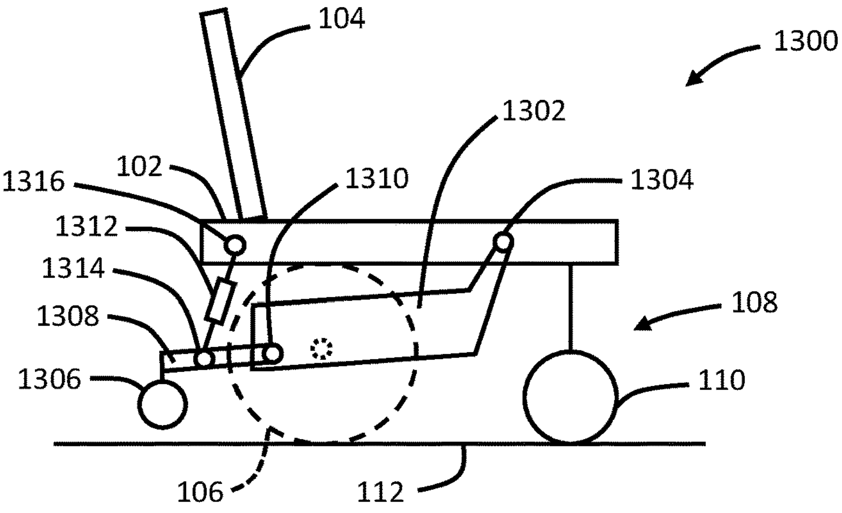
FIGS. 13A, 13B, 13C and 13D illustrate an embodiment of a wheelchair having one or more anti-tip wheels.
Figure 13B:
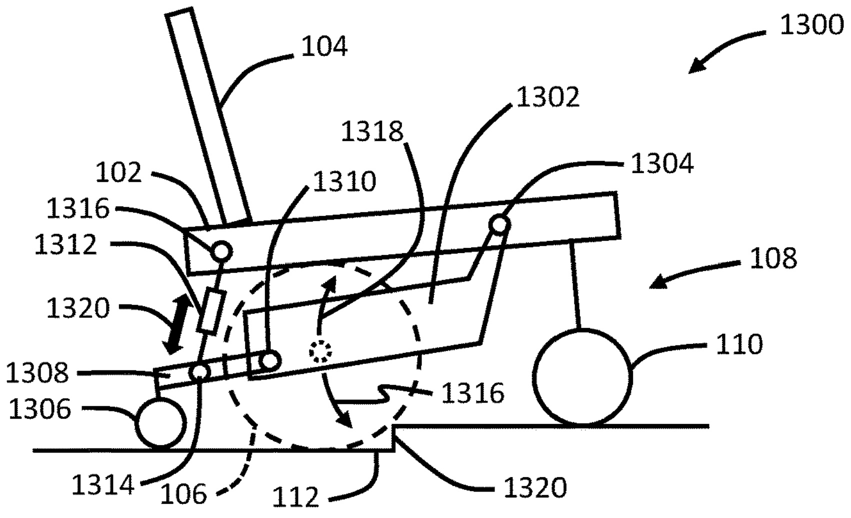
Figure 13C:
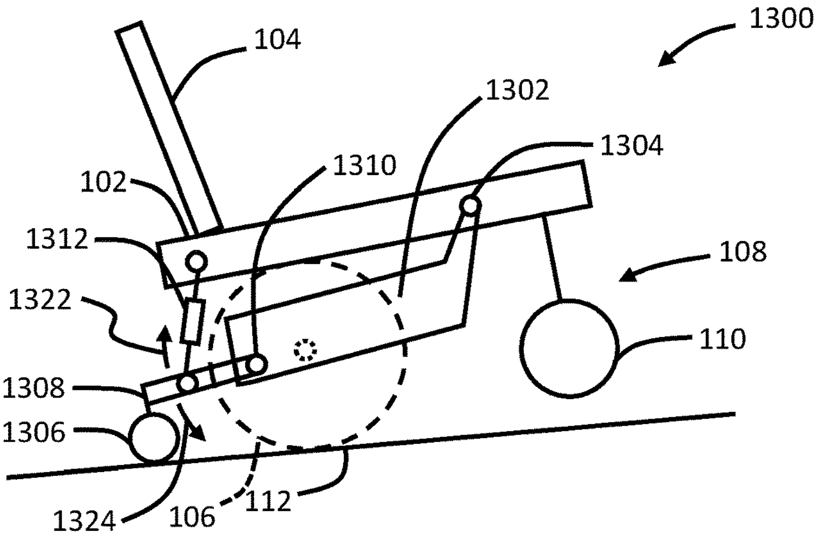

FIGS. 13A-13C illustrate one embodiment of a wheelchair 1300 having a suspension system for one or more anti-tip wheels is shown. Referring to FIG. 13A, wheelchair 1300 includes a first link or pivot arm 1302 connected to frame 102 by pivot connection 1304. At least one rear anti-tip wheel 1306 is connected to the wheelchair via a suspension system. This includes link or pivot arm 1308 which is connected to link 1302 by pivot connection 1310. Resilient member 1312, which can be a shock(s), spring(s), spring and shock absorber combination, gas cylinders, lockable gas cylinders (or combinations of the foregoing) or other resilient/biasing assembly, is connected on one end to link 1308 via pivot connection 1314 and on the other end to frame 102 by pivot connection 1316. In one embodiment, resilient member 1312 provides links 1302 and 1304 suspension, either individually or as a combination, as will be described.

Referring now to FIG. 13B, a schematic view of wheelchair 1300 driving over or traversing an obstacle such as curb 1320 is shown where resilient member 1312 provides the combination of links 1302 and 1308 with suspension. Front wheel 110 has already driven over obstacle 1320 and rests on the obstacle's elevated surface. As wheelchair 1300 continues to drive over the obstacle or curb 1320, drive wheel 106 will encounter obstacle 1320. As drive wheel 106 encounters obstacle 1320, and impact or shock will be generated. This impact or shock will be at least partially absorbed by resilient member 1312 by the pivoting motion of link 1302 about pivot connection 1304. The impact or shock is at least partially absorbed by the compression of resilient member 1302 as schematically illustrated by arrow 1320. Under this scenario, links 1302 and 1308 function as a substantially rigid single link (i.e., there is little to no pivoting about pivot connection 1310 by either link). Pivot arrows 1316 and 1318 schematically illustrate the pivoting motion of link 1302 as it makes contact and overcomes obstacle 1320 and consequently compresses and decompresses resilient member 1312. For larger objects or curbs 1320, links 1308 and 1302 can pivot about connection 1310 thereby allowing link 1302 and drive wheel 106 to maintain contact with the driving surface 112 to allow traction to drive wheel 106 for driving over obstacle 1320. Resilient member 1312 compresses in this scenario to allow links 1302 and 1308 to pivot to provide the increased traction and shock absorption in driving over obstacle 1320. Thus, shocks and impacts on drive wheel 106 are at least partially, if not substantially, absorbed by resilient member 1312 and not transmitted to the wheelchair user and drive traction is improved and/or not diminished by any high-centering or bridging effect whereby drive wheel 106 may lose traction with support surface 112.

Referring now to FIG. 13C, a schematic view of wheelchair 1300 tipping rearward is shown where resilient member 1312 provides anti-tip wheel 1306 and associated link 1308 with suspension to soften any hard or jarring stop action to the tipping behavior. Rearward tipping behavior can be caused by any number of conditions including, for example, driving up a steep incline or high obstacle, and/or having a user plus wheelchair center of gravity too far rearward on the wheelchair frame. When wheelchair 1300 begins to tip rearward, anti-tip wheel 1306 contacts support surface 112 to stop or limit the rearward tipping motion. Resilient member 1312 provides a degree of suspension, cushioning or softening in such situations. Rather than providing a hard stop when anti-tip wheel 1306 contacts support surface 112, resilient member 1312 compresses to allow link 1308 to pivot about pivot connection 1310. This provides link 1308 with a suspension system to soften or cushion any hard impacts or shocks that would have been generated by anti-tip wheel 1306 contacting driving or support surface 112. This pivoting action also allows link or pivot arm 1302 to Thus, shocks and/or impacts caused by anti-tip wheel 1306 contacting driving or support surface 112 are at least partially, if not substantially, absorbed by resilient member 1312 and not transmitted to the wheelchair user.

Figure 13D:
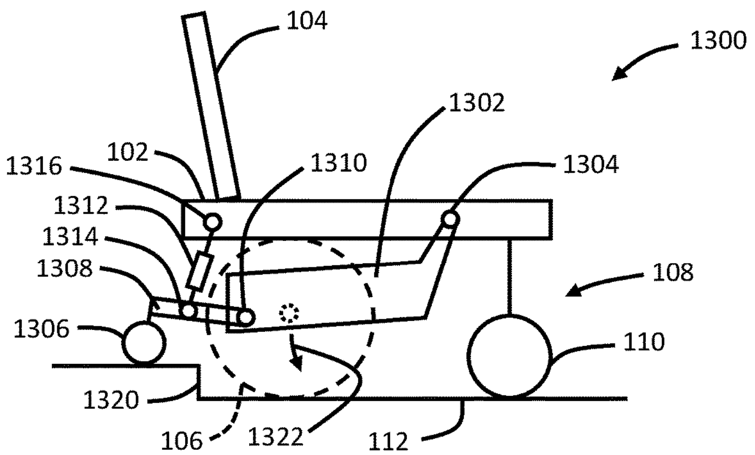

FIG. 13D illustrates a schematic view of wheelchair 1300 traveling down a curb or obstacle 1320. In this scenario, drive wheel 106 has come down from the elevated obstacle height 1320, while rear anti-tip wheel 1306 has not yet done so and remains thereon. This is accomplished by link or pivot arm 1302 pivoting downward (see arrow 1322) as drive wheel 106 descends to lower support surface 112. Pivot connection 1310 and compression of resilient member 1312 allow links or pivot arms 1302 and 1308 to pivot with respect to each other under this scenario. This allows drive wheel 106 to make contact with lower support surface 112 thereby providing traction instead of high-centering or bridging whereby drive wheel may be elevated above surface 112 with no traction. Further, compression of resilient member 1312 provide suspension to soften the impact or shock of drive wheel dropping from the elevated surface obstacle 1320 to the lower support surface. In this manner, traction to drive wheel 106 is increased while also providing at least some, if not all, absorption of impacts and/or shocks while descending such obstacles.

Hence, resilient member 1312 provides anti-tip wheel 1306 and associated links 1302 and 1308 with suspension to soften any hard or jarring stop action to the tipping behavior and/or driving onto or off of obstacles. Furthermore, resilient member 1312 and pivot connection 1310 also provide the wheelchair with a suspension system that increases drive wheel 106 traction during tipping behavior and during climbing and descending of obstacles.

Figure 14:
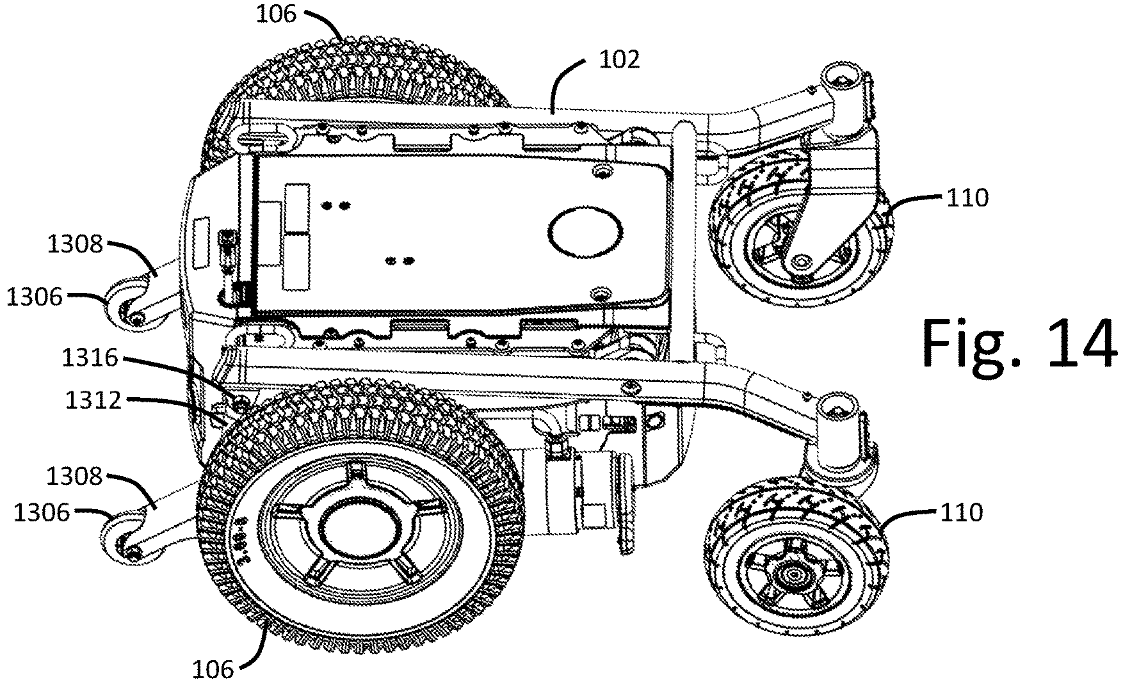
FIG. 14 illustrates a perspective view of another embodiment of a wheelchair having one or more anti-tip wheels.

FIG. 14 illustrates a perspective view of one embodiment of a wheelchair having one or more anti-tip wheels 1306. In this embodiment, two anti-tip wheels 1306 are provided, as well as two drive wheels 106 and two front wheels 110. In this embodiment, each of the anti-tip wheels 1306 and drive wheels are suspended on the left and right sides of wheelchair frame 102. While equivalent left and right side arrangements are shown, other embodiments can include a single arrangement centered on the frame of the wheelchair.

Figure 15:
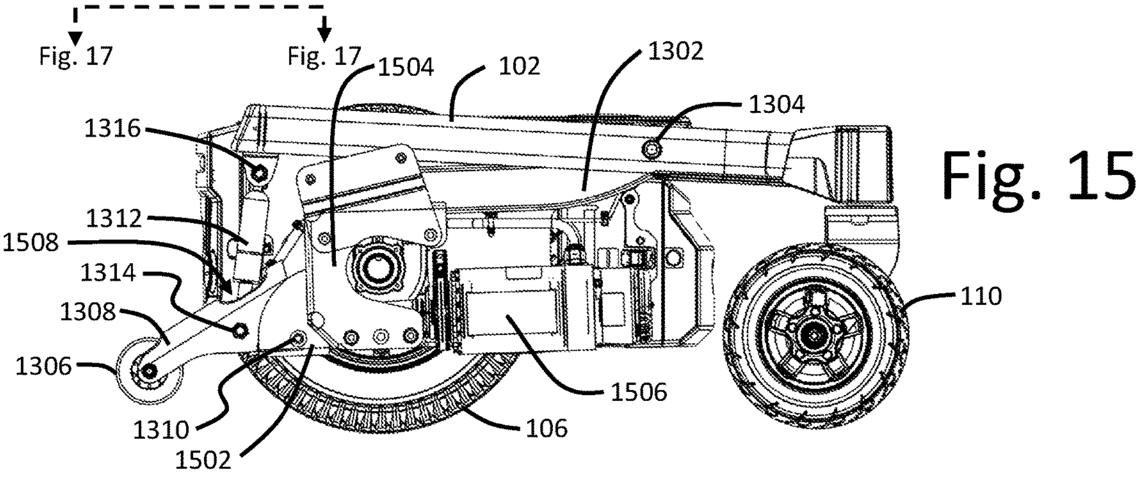
FIG. 15 illustrates a side elevational view of the wheelchair of FIG. 14 with one of the main drive wheels removed.
Figure 16:
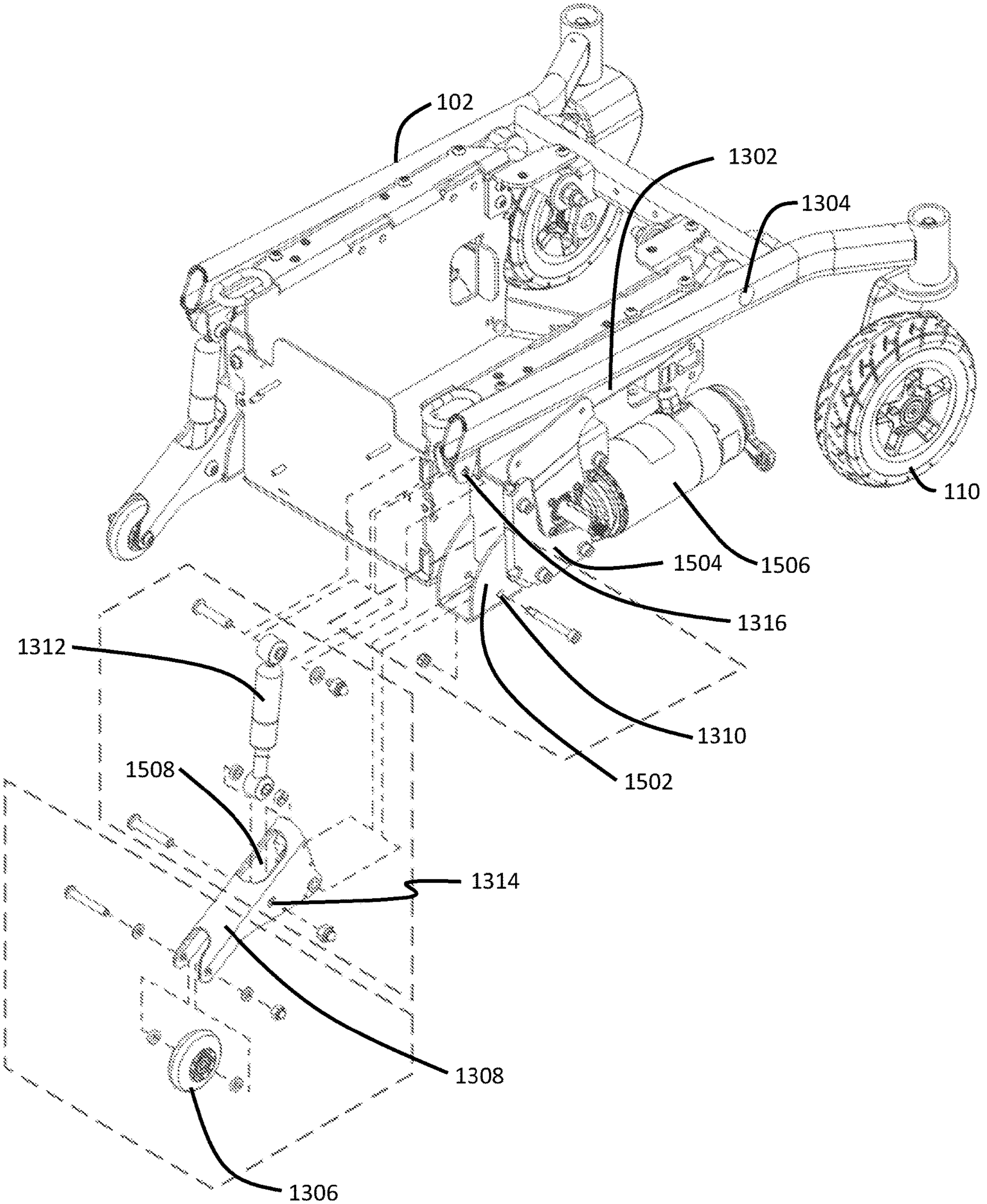
FIG. 16 illustrates a partially exploded perspective view of the wheelchair of FIG. 14.

FIG. 15 illustrates a side elevational view of the wheelchair of FIG. 14 with one of the main drive wheels removed and FIG. 16 illustrates a partially exploded perspective view of the wheelchair of FIG. 14. Link or pivot arm 1302 includes a first extension portion 1502 to which link 1308 is pivotally connected at pivot connection 1310. Link 1302 also includes a motor mount portion 1504 to which a drive system 1506 (e.g., motor, motor and gearbox combination, etc.) are connected. In the present embodiment, link 1308 includes a space or opening 1508 through which resilient member 1302 may extend to connect to pivot connection 1314.

Figure 17:
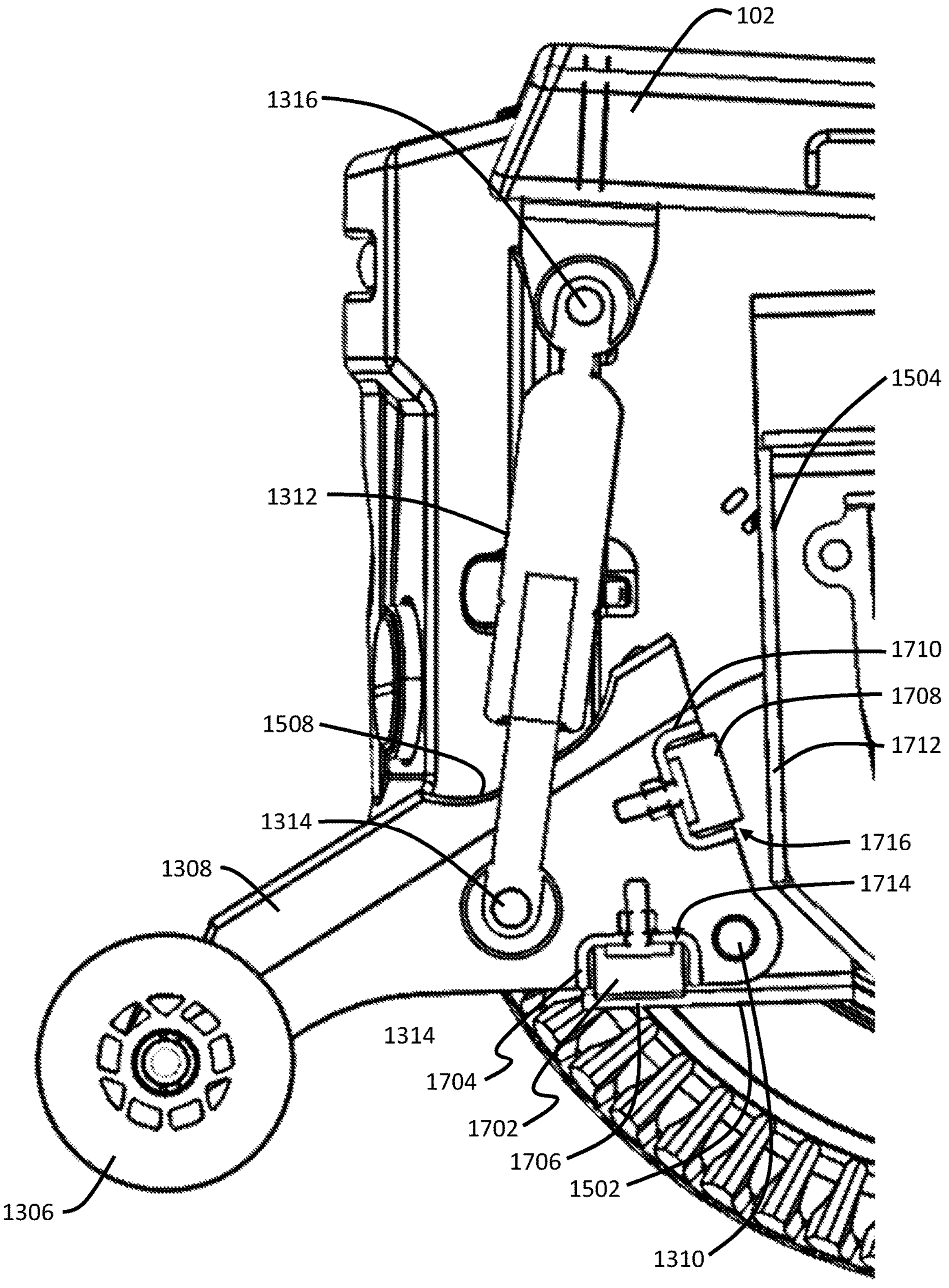
FIG. 17 illustrates a partial perspective view taken along the section lines indicated in FIG. 15.

FIG. 17 illustrates a partial perspective view taken along the section lines indicated in FIG. 15. Link or pivot arm 1308 includes a first stop surface 1702 and a second stop surface 1708, which can be in the form of pivot stops, bumps, bumpers, pads, etc. In one embodiment, stop surfaces 1702 and 1708 can be made of a resilient and/or elastic material such as, for example, polymer and non-polymer rubbers and other elastomeric materials, springs, etc. In one preferred embodiment, the resilient and/or elastic material possesses a medium to slightly hard stiffness to at least partially stop movement with some degree of cushion (versus a hard impact). In other embodiments, materials other than resilient and/or elastic materials can be used including, for example, hard surfaces. In one preferred embodiment, stop surfaces 1702 and 1708 comprise at least a portion of an elastomeric member having a generally cylindrical shape. Stop surfaces 1702 and 1708 are received and mounted within mounting portions 1704 and 1710, respectively. Mounting portions 1704 and 1710 included recesses/spaces 1714 and 1716 for receiving the bodies of stop surfaces 1702 and 1708. The exact configuration of the mounting portions is not critical so long as they mount the stop surfaces 1702 and 1708 to link 1308.

Link or pivot arm 1302 includes contact portions 1706 and 1712 for contacting stop surfaces 1702 and 1708 of link or pivot arm 1308. Contact portions 1706 and 1712 are generally disposed opposite to stop surfaces 1702 and 1708, respectively, and selectively make contact therewith to limit the range of pivot of link 1308. In one embodiment, the angle between contact portions 1706 and 1712 is approximately 90 degrees and the angle between stop surfaces 1702 and 1708 is approximately 75 degrees thereby providing link 1308 with a pivot range of motion of approximately 15 degrees. In other embodiments, more or less than 15 degrees of range of motion can be provided. Stop surfaces 1706 and 1712 can be made of any appropriate stop material including elastomeric and resilient materials such as, for example, polymer and non-polymer rubbers and other elastomeric materials, springs, etc. and harder materials such as, for example, metals, plastics, fiberglass, etc. Still further, stop surfaces 1706 and 1712 can be configured as flat wall surfaces, coated surfaces, bumps, bumpers, etc. While the stop surfaces 1702 and 1708 are located on link 1308 and contact portions 1706 and 1712 are located on link 1308, the opposite configuration may also be used.

Figure 18:
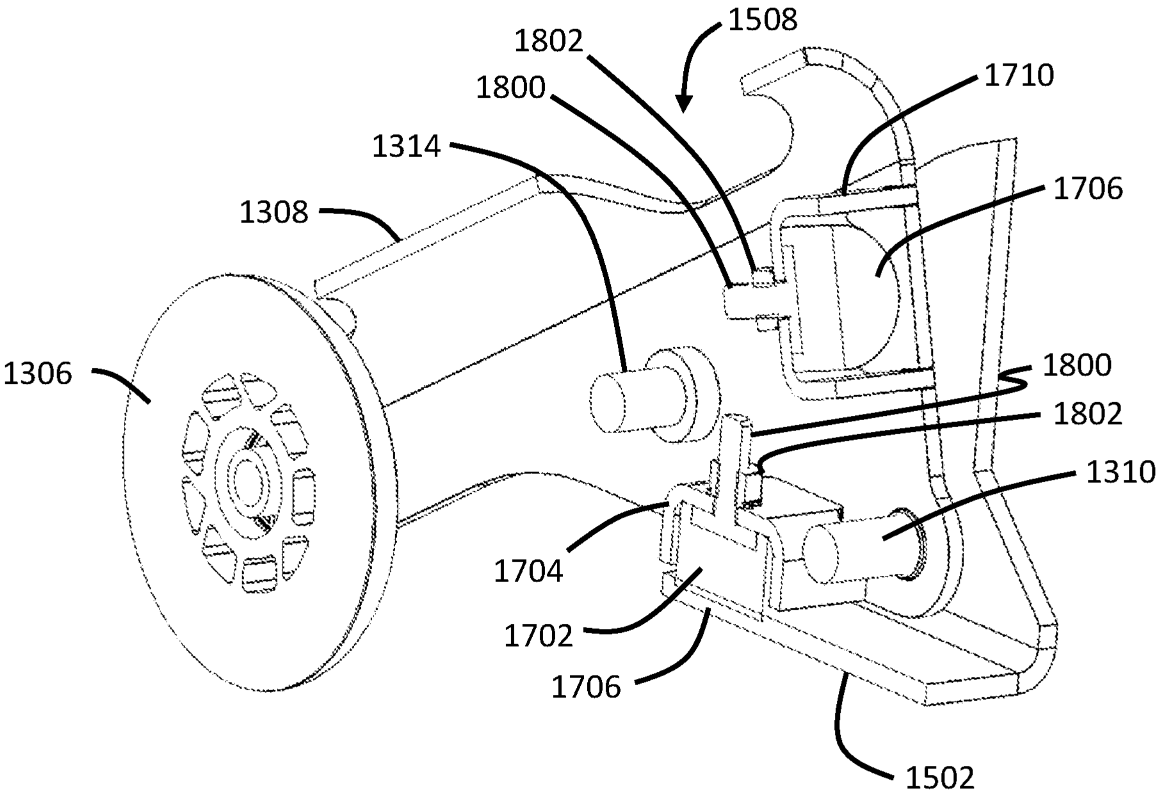
FIG. 18 illustrates a partial sectional perspective view of the components shown in FIG. 17.

Referring now to FIGS. 17 and 18, stop surfaces 1702 and 1708 can include, in some embodiments, an adjustment mechanism having a threaded body 1800 extending from the stop surface bodies 1702 and 1708. The threaded body 1800 is received in an aperture of mounting portions 1704 and 1710. A fastener/nut 1802 can be used with threaded body 1800 to securely mount the stop surface bodies 1702 and 1708 to link 1308.

Referring back to FIG. 17, in one embodiment, links or pivot arms 1302 and 1308 act as a combined single pivot arm under normal or typical driving conditions (e.g., no substantial tipping behavior). In this arrangement, a force or weight associated with the center of gravity of the wheelchair (both with and without the user) bears down on resilient member 1312 through pivot connection 1316. Resilient member 1312 transfers this force to link or pivot arm 1308. And, link or pivot arm 1308 transfers this force via contact of its stop surface 1702 with contact portion 1706 to link or pivot arm 1302 and drive wheel 106. Thus, link or pivot arm 1308 cannot pivot about pivot connection 1310 with respect to link or pivot arm 1302 thereby combining the two links or pivot arms to act in unison to approximate a single pivot arm. As described above in connection with FIG. 13B, this provides link or pivot arm 1302 with a suspension system using resilient member 1312.

During tipping, when anti-tip wheel 1306 makes contact with the support surface such as shown, for example, in FIG. 13C, link or pivot arm 1308 can rotate about pivot connection 1310 thereby having a suspension independent of link or pivot arm 1302. In this arrangement, resilient member 1312 compresses under the force of the rearward tipping action and anti-tip wheel 1306 contacting the support or driving surface. This allows link or pivot arm 1308 to pivot about pivot connection 1310 to compress resilient member 1312. In one embodiment, resilient member 1312 is configured to increase its resistance to compression as it reduces in length. Thus, the amount of compression of resilient member 1312 may initially be significant and thereafter gradually reduced with the continued application of force. In this manner, resilient member 1312 provides a soft suspension to absorb impacts and shocks that may otherwise occur when anti-tip wheel 1306 contacts the support or driving surface to bring the tipping action thereby softly or gradually to a stop. Should the tipping force be excessive and/or there be a failure of resilient member 1312, stop surface 1708 of link or pivot arm 1308 will engage contact portion 1712 of link or pivot arm 1302 to stop any further tipping action. As previously described, in one embodiment, this occurs after link or pivot arm 1308 pivots approximately 15 degrees about pivot connection 1310 but other ranges are also contemplated. When the wheelchair is returned to level or normal position and anti-tip wheel 1306 is moved from contacting the driving or support surface, resilient member 1312 decompresses and returns with link or pivot arm 1308 to their default positions or configurations as shown in FIG. 17.

Thus, resilient member 1312 has the ability to provide independent suspension to either or both of links or pivot arms 1302 and 1308. In one arrangement, the overall wheelchair center of gravity force on resilient member 1312 causes links or pivot arms 1302 and 1308 to in effect act as a single pivot arm thereby providing a suspension system to drive wheel(s) 106 (as described in connection with, for example, FIG. 13B). In another arrangement, when tipping behavior causes anti-tip wheel 106 to contact the support or driving surface, resilient member 1312 compresses and allows link or pivot arm 1308 to pivot with respect to link or pivot arm 1302 via pivot connection 1310. This softens the impact of anti-tip wheel 1306 contacting the support or driving surface because resilient member 1316 absorbs at least some of the impact as it compresses. Resilient member 1312 then decompresses under its own force after the tipping behavior has stopped and the wheelchair is returned to its normal position (e.g., untipped).

While the present inventions and designs have been illustrated by the description of embodiments thereof, and while the embodiments have been described in considerable detail, it is not the intention of the descriptions to restrict or in any way limit the scope of the appended claims to such detail. The embodiments disclosed herein are applicable to any configuration of wheelchair or mobility vehicle including front wheel drive (FWD), center wheel drive (CWD) and/or RWD (rear wheel drive). Furthermore, the embodiments disclosed herein are applicable to any wheel assembly including front and rear anti-tip wheel assemblies, which may be in the form of caster wheels and/or fixed position wheels (non-caster wheels). Additional advantages and modifications will readily appear to those skilled in the art. Therefore, the inventions and designs, in broader aspects, are not limited to the specific details, the representative apparatus, and illustrative examples shown and described. Accordingly, departures can be made from such details without departing from the spirit or scope of the general inventive concepts.

What is claimed is:

1. A wheel assembly for a vehicle comprising:
a housing having an inner wall surface;
a first sleeve comprising inner and outer wall surfaces, the outer wall surface at least partially in contact with the housing inner wall surface;
a resilient member comprising inner and outer wall surfaces, the resilient member outer wall surface at least partially in contact with the first sleeve inner wall surface;
a second sleeve comprising inner and outer wall surfaces, the outer wall surface at least partially in contact with the resilient member inner wall surface;
a wheel spindle member having an outer surface, the outer surface at least partially in contact with the second sleeve inner wall surface; and
a wheel connected to the spindle member.

2. The wheel assembly of claim 1 wherein the first and second sleeves and the resilient member each comprise cylindrical bodies.

3. The wheel assembly of claim 1 wherein the housing inner wall surface comprises a recessed portion for receiving at a portion of the first sleeve.

4. The wheel assembly of claim 1 wherein the housing inner wall comprises a recessed portion for receiving a portion of a retaining ring.

5. The wheel assembly of claim 1 wherein the housing further comprises an inner space for at least partially receiving the first and second sleeves, the resilient member, and the wheel spindle member.

6. The wheel assembly of claim 1 wherein the resilient member comprises a resilient cylindrical bushing between the first and second sleeves.

7. The wheel assembly of claim 1 wherein the second sleeve comprises an inner space for receiving at least a portion of the wheel spindle member.

8. The wheel assembly of claim 1 wherein the wheel spindle member extends beyond end portions of the first and second sleeves and the resilient member.

9. The wheel assembly of claim 1 wherein the wheel spindle member comprises a flange support.

10. The wheel assembly of claim 1 further comprising a lubricant between the second sleeve and the wheel spindle member.

11. A wheelchair comprising:
a frame;
a first pivot arm connected to the frame at a first pivot connection; the pivot arm comprising a drive wheel connection;
a second pivot arm connected to the first pivot arm at a second pivot connection; the second pivot arm comprising spaced apart first and second pivot stop surfaces and the first pivot arm comprising spaced apart first and second contact surfaces for the first and second pivot stop surfaces;
at least one rear wheel connected to the second pivot arm;
a biasing member having a first portion connected to the frame and a second portion connected to the second pivot arm; and
wherein the biasing member comprises a first position having the first pivot stop surface in contact with the first contact surface.

12. The wheelchair of claim 11 wherein the drive wheel connection is disposed in a rear-wheel drive position.

13. The wheelchair of claim 11 wherein the biasing member comprises a second position having the first pivot stop surface spaced apart from the first contact surface.

14. The wheelchair of claim 11 wherein the second pivot arm pivots relative to the first pivot arm about the second pivot connection in response to a rearward tipping behavior of the wheelchair.

15. The wheelchair of claim 11 wherein the first and second pivot stop surfaces comprise a bumper member.

16. The wheelchair of claim 11 wherein the first and second contact surfaces comprise a planar wall portion.

17. The wheelchair of claim 11 wherein the first and second pivot stop surfaces comprises a planar wall portion.

18. The wheelchair of claim 11 wherein the first and second contact surfaces comprise a bumper member.

19. The wheelchair of claim 11 wherein the second pivot arm comprises a recess receiving the first pivot stop surface.

20. A wheelchair comprising:
a frame;
a first pivot arm connected to the frame at a first pivot connection; the pivot arm comprising a drive wheel connection;
a second pivot arm connected to the first pivot arm at a second pivot connection; the second pivot arm comprising spaced apart first and second pivot stop surfaces and the first pivot arm comprising spaced apart first and second contact surfaces for the first and second pivot stop surfaces;
at least one rear wheel connected to the second pivot arm;
a biasing member having a first portion connected to the frame and a second portion connected to the second pivot arm; and
wherein the first and second pivot stop surfaces comprise a planar wall portion.

21. A wheelchair comprising:
a frame;
a first pivot arm connected to the frame at a first pivot connection; the pivot arm comprising a drive wheel connection;
a second pivot arm connected to the first pivot arm at a second pivot connection; the second pivot arm comprising spaced apart first and second pivot stop surfaces and the first pivot arm comprising spaced apart first and second contact surfaces for the first and second pivot stop surfaces;
arm;
at least one rear wheel connected to the second pivot a biasing member having a first portion connected to the frame and a second portion connected to the second pivot arm; and
wherein the first and second pivot stop surfaces comprise a bumper member.

22. A wheelchair comprising:
a frame;
a first pivot arm connected to the frame at a first pivot connection; the pivot arm comprising a drive wheel connection;
a second pivot arm connected to the first pivot arm at a second pivot connection; the second pivot arm comprising spaced apart first and second pivot stop surfaces and the first pivot arm comprising spaced apart first and second contact surfaces for the first and second pivot stop surfaces;
at least one rear wheel connected to the second pivot arm;
a biasing member having a first portion connected to the frame and a second portion connected to the second pivot arm; and
wherein the first and second contact surfaces comprise a bumper member.

23. A wheelchair comprising:

a frame;

a first pivot arm connected to the frame at a first pivot connection; the pivot arm comprising a drive wheel connection;

a second pivot arm connected to the first pivot arm at a second pivot connection; the second pivot arm comprising spaced apart first and second pivot stop surfaces and the first pivot arm comprising spaced apart first and second contact surfaces for the first and second pivot stop surfaces;

at least one rear wheel connected to the second pivot arm;

a biasing member having a first portion connected to the frame and a second portion connected to the second pivot arm; and wherein the second pivot arm comprises a recess receiving the first pivot stop surface.

* * * * *